United States Patent
Sakaguchi et al.

(10) Patent No.: US 10,824,378 B2
(45) Date of Patent: Nov. 3, 2020

(54) IMAGE FORMING APPARATUS, IMAGE FORMING SYSTEM AND NON-TRANSITORY COMPUTER READABLE MEDIUM STORING CONTROL PROGRAM

(71) Applicant: KYOCERA Document Solutions Inc., Osaka (JP)

(72) Inventors: Shoichi Sakaguchi, Osaka (JP); Hiroyuki Uenishi, Osaka (JP)

(73) Assignee: KYOCERA Document Solutions, Inc., Osaka (JP)

( * ) Notice: Subject to any disclaimer, the term of this patent is extended or adjusted under 35 U.S.C. 154(b) by 0 days.

(21) Appl. No.: 16/596,982

(22) Filed: Oct. 9, 2019

(65) Prior Publication Data
US 2020/0117404 A1    Apr. 16, 2020

(30) Foreign Application Priority Data

Oct. 10, 2018   (JP) ................... 2018-191662

(51) Int. Cl.
*G06F 3/12* (2006.01)

(52) U.S. Cl.
CPC .......... *G06F 3/1225* (2013.01); *G06F 3/1285* (2013.01)

(58) Field of Classification Search
CPC .................................................. G06F 3/1225
See application file for complete search history.

(56) References Cited

U.S. PATENT DOCUMENTS

| | | | | |
|---|---|---|---|---|
| 6,597,469 B1* | 7/2003 | Kuroyanagi | ....... | H04N 1/00832 235/380 |
| 2004/0109196 A1* | 6/2004 | Nakao | ................ | H04N 1/00278 358/1.15 |
| 2004/0125398 A1* | 7/2004 | Aiyama | ................ | G06F 3/1257 358/1.14 |
| 2005/0105129 A1* | 5/2005 | Takahashi | .......... | H04N 1/00432 358/1.15 |
| 2006/0290965 A1* | 12/2006 | Sugai | ..................... | G06F 3/1204 358/1.13 |
| 2010/0235772 A1* | 9/2010 | Ikeura | ................ | H04N 1/32112 715/771 |
| 2010/0245909 A1* | 9/2010 | Yamaguchi | ........ | H04N 1/00514 358/1.15 |
| 2011/0066960 A1* | 3/2011 | Suzuki | ..................... | G06F 8/65 715/764 |

(Continued)

FOREIGN PATENT DOCUMENTS

| JP | 2010-218397 A | 9/2010 |
|---|---|---|
| JP | 2019128633 A * | 8/2019 |

*Primary Examiner* — Ted W Barnes
(74) *Attorney, Agent, or Firm* — Studebaker & Brackett PC

(57) ABSTRACT

An image forming apparatus used by a plurality of users who have mutually different characteristics comprises a first storage, a second storage, a management part, and a notification part. The first storage stores a characteristic information indicating characteristics of the plurality of users. The second storage is capable of storing a plurality of application programs used by the plurality of users. The management part manages installation and execution of the plurality of application programs. The notification part notifies, according to the characteristic information, a recommendation information related to the application program for the plurality of users.

14 Claims, 8 Drawing Sheets

(56) References Cited

U.S. PATENT DOCUMENTS

| | | | |
|---|---|---|---|
| 2012/0194851 A1* | 8/2012 | Srinivasmurthy | G06Q 30/02 358/1.15 |
| 2013/0290318 A1* | 10/2013 | Shapira | G06F 16/248 707/723 |
| 2014/0095264 A1* | 4/2014 | Grosz | H04N 1/00 705/7.36 |
| 2017/0180387 A1* | 6/2017 | Hayashi | G06F 21/121 |
| 2018/0024787 A1* | 1/2018 | Sakawaki | G06F 3/1205 358/1.15 |
| 2019/0007575 A1* | 1/2019 | Hirakata | G06F 3/1204 |
| 2019/0325498 A1* | 10/2019 | Clark | G06K 7/1417 |

* cited by examiner

FIG. 5

| USER ID | NAME | DEPARTMENT | POSITION | NUMBER OF MEETINGS (MONTHLY AGERAGE) | SCANNER USEGE COUNT | COPY USAGE COUNT | ... |
|---|---|---|---|---|---|---|---|
| 0001 | USER X | GENERAL AFFAIRS DEPARTMENT | GENERAL STAFF | 5 times | 100 times | 300 times | ... |
| 0002 | USER Y | GLOBAL DEPARTMENT | RESPONSIBLE PERSON | 25 times | 50 times | 40 times | ... |
| 0003 | USER Z | TRAINING DEPARTMENT | RESPONSIBLE PERSON | 20 times | 10 times | 65 times | ... |
| ... | ... | ... | ... | ... | ... | ... | ... |

C1

IMAGE FORMING APPARATUS, IMAGE FORMING SYSTEM AND NON-TRANSITORY COMPUTER READABLE MEDIUM STORING CONTROL PROGRAM

INCORPORATION BY REFERENCE

This application is based on and claims the benefit of priority from Japanese Patent application No. 2018-191662 filed on Oct. 10, 2018, the entire contents of which are incorporated herein by reference.

BACKGROUND

The present disclosure relates to an image forming apparatus which is used by a plurality of users and can perform application program, an image forming system including the image forming apparatus, and a non-transitory computer readable medium storing a controlling program of the image forming apparatus.

Information processing technology is utilized in an electrical device and an electronic device other than an information processing apparatus with development and popularization of the information processing technology. For example, it is possible to additionally introduce software functions which an image forming apparatus does not have in a default state by installing various application programs on an image forming apparatus such as a multifunction peripheral or the like.

It is possible to install application programs on an image forming apparatus by various mediums. For example, it is possible to download and install application programs via internet, other than to install application programs by using an external storage medium such as the USB memory or the like.

The image forming apparatus such as the multifunction peripheral or the like is generally shared and used by a plurality of users compared to the information processing apparatus which is generally used for personal use. Therefore, as described above, if a certain user (for example, a manager of the image forming apparatus) simply installs application programs on the image forming apparatus, it is difficult for other user to recognize the application programs. Even if an application program suitable for the certain user is installed on the image forming apparatus, if the installation is not recognized by the certain user, the application program is never used and its function is never exhibited.

SUMMARY

An image forming apparatus of the present disclosure is the image forming apparatus used by a plurality of users who have mutually different characteristics, and comprises a first storage, a second storage, a management part, and a notification part. The first storage stores a characteristic information indicating characteristics of the plurality of users. The second storage is capable of storing a plurality of application programs used by the plurality of users. The management part manages installation and execution of the plurality of application programs. The notification part notifies, according to the characteristic information, a recommendation information related to the application program for the plurality of users.

An image forming system of the present disclosure comprises a plurality of an image forming apparatus used by a plurality of users who have mutually different characteristics. The image forming apparatus comprises a first storage, a second storage, a management part, and a notification part. The first storage stores a characteristic information indicating characteristics of the plurality of users. The second storage is capable of storing a plurality of application programs used by the plurality of users. The management part manages installation and execution of the plurality of application programs. The notification part notifies, according to the characteristic information, a recommendation information related to the application program for the plurality of users. In addition, the image forming apparatus further comprises a reward giving part giving reward to the users in response to the installation and the execution of the application program according to the recommendation information. And in the image forming system, the reward giving parts of the plurality of image forming apparatus may, in cooperation with each other, set the reward which gives the user to become higher, as a frequency of use the image forming apparatus in which the installation or the execution of the application program is performed becomes lower.

A non-transitory computer readable medium of the present disclosure stores a control program. The control program is executed in an image forming apparatus comprising a first storage storing a characteristic information indicating characteristics of the plurality of users and a second storage being capable of storing a plurality of application programs used by the plurality of users. The control program makes a computer of the image forming apparatus function as a management part managing installation and execution of the plurality of application programs and a notification part notifying, according to the characteristic information, a recommendation information related to the application program for the plurality of users.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 5 is a diagram showing an example of a characteristic information according to the embodiment of the present disclosure.

DETAILED DESCRIPTION

Hereinafter, with reference to the drawings, an embodiment of the present disclosure will be described. In the present embodiment, a case in which the configuration of an image forming apparatus according to the present disclosure is applied to a multifunction peripheral 1 (Multifunction Peripheral, MFP) that includes a print function, a copy function, a fax function, a data transmission/reception function and others in a compound manner. The multifunction peripheral 1 is used by a plurality of users who have mutually different characteristics. Hereinafter, for the sake of convenience, the front side in FIG. 1 will be described as the front side of the multifunction peripheral 1.

Figure 1:
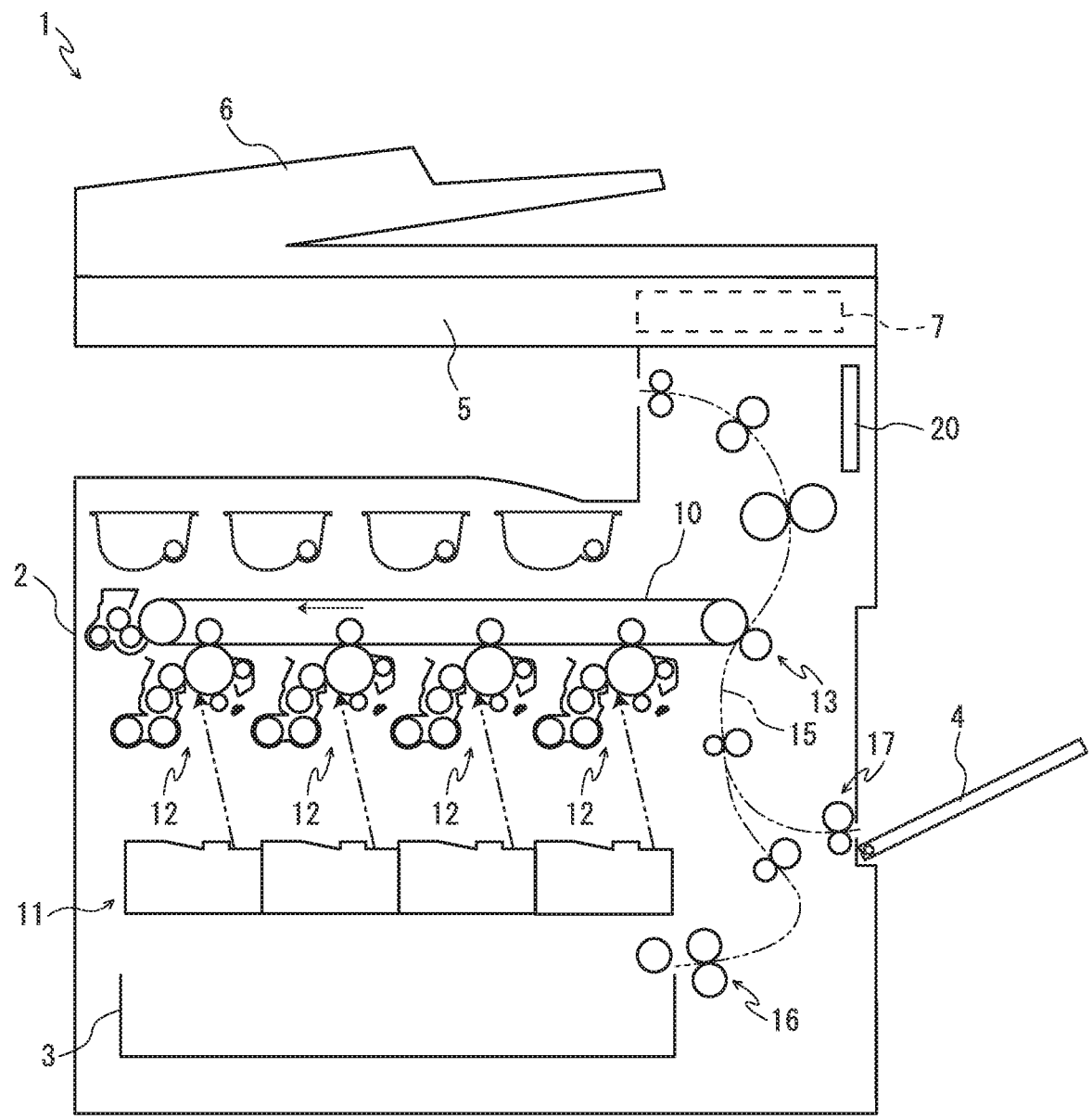
FIG. 1 is a sectional view showing a multifunction peripheral according to an embodiment of the present disclosure.

First, whole structure of the multifunction peripheral 1 (image forming apparatus) will be described. As indicated in FIG. 1, the multifunction peripheral 1 includes a device body 2 shaped into a substantially box. At a lower part of the device body 2, a sheet feeding cartridge 3 is housed detachably as a sheet feeder which stores sheets inside the multifunction peripheral 1. At a right side part of the device body 2, a manual feed tray 4 is provided so as to be capable of opening and closing as a sheet feeder (for placing sheets) which stores sheets outside the multifunction peripheral 1. In sheet ejecting space which is at the upper part of the device body 2, a sheet ejecting tray is provided. The sheet feeding cartridge 3, the manual feed tray 4, and the sheet ejecting tray are used for conveying a sheet on which an image forming part 12 described below forms an image.

At the upper part of the device body 2, an image scanning apparatus 5 which scans objects to be scanned such as documents or the like and output scan data is provided. Upward the device body 2, a document convey part 6 which includes an auto document conveying device (Auto Document Feeder, ADF) which feeds documents to the image scanning apparatus 5 and others is provided. The document convey part 6 is installed so as to be capable of opening and closing to the image scanning apparatus 5.

Moreover, at the upper part the device body 2, an operation display unit 7 (display part) for operations of a user is installed at the front side. The operation display unit 7 includes, for example, operation keys such as numeric keys, a start key, a system menu key, a transmission key, a copy key, a confirmation key and others, and a display device such as a touch panel or the like, and receives input of setting for setting such as the number of prints and print concentration and others from user.

At a middle part of the device body 2, an intermediate transfer belt 10 is laid among a plurality of rollers. Below the intermediate transfer belt 10, an exposure device 11 including a Laser Scanning Unit (LSU) is provided. Four image forming parts 12 are provided for the respective colors of toner (for example, four colors of yellow, cyan, magenta, and black) along a surface of the lower side of the intermediate transfer belt 10.

The respective image forming units 12 include a photosensitive drum which is capable of rotating, and a charger, a development device, a primary transferring unit, a cleaning device, and a static eliminator are disposed around the photosensitive drum in the order of process of primary transferring. A secondary transferring unit 13 is provided at the right end of the intermediate transfer belt 10, and the secondary transferring unit 13 is configured by a part of the right end of the intermediate transfer belt 10 and a secondary transferring roller. A cleaning device for cleaning the intermediate transfer belt 10 is provided at the left end of the intermediate transfer belt 10. The each of image forming units 12 is an element which perform image forming to recording medium such as sheet or the like.

At a right part of the device body 2, a conveying path 15 for sheets is provided. At a upstream part of the conveying path 15, a sheet feeder mechanism 16 configured by feeder rollers and others is provided corresponding to the sheet feeding cartridge 3. At a midstream of the conveying path 15, the above secondary transferring unit 13 is provided. Moreover, the conveying path 15 is connected to the manual feed tray 4 at a downstream side of the sheet feeding cartridge 3 and at an upstream side of secondary transferring unit 13. In a vicinity of the manual feed tray 4, a sheet feeder mechanism 17 configured by feeder rollers and others is provided. At a downstream part of the conveying path 15, a fixing device is provided, and at a downstream end of the conveying path 15, a sheet ejecting port is provided. Moreover, the device body 2 includes a control device 20 which controls each part of the multifunction peripheral 1.

Next, image forming operation of the above multifunction peripheral Twill be described. When the power of the multifunction peripheral 1 is turned on, the control device 20 performs initializing of various parameters, and others. In the multifunction peripheral 1, data for printing is input from the image scanning apparatus 5, external computers and others, and when start of printing instructs, the image forming operation is performed under the control by the control device 20 as follow.

First, the control device 20 creates output image data to be a target of image forming. Then, under the control by the control device 20, in the respective image forming units 12, an electrostatic latent image is formed on the photosensitive drum by exposing the photosensitive drum by the exposure device 11 based on output image data after the photosensitive drum is charged by the charger.

The electrostatic latent image on the photosensitive drum is developed to toner images of respective colors by the development device. The toner images on the photosensitive drum are primarily transferred on a surface of the intermediate transfer belt 10 by the primary transferring unit. By the four image forming units 12 sequentially repeat the above operations, a full color toner image (color toner image) is formed on the intermediate transfer belt 10. The color toner image is, by the rotation of the intermediate transfer belt 10, supplied to the secondary transferring unit 13 at predetermined secondary transferring timing.

On the other hand, a sheet stored in the sheet feeding cartridge 3 or the manual feed tray 4 is taken out by the sheet feeder mechanism 16 or the sheet feeder mechanism 17 and is conveyed on the conveying path 15. Then, the sheet on the conveying path 15 is conveyed to the secondary transferring unit 13 at the above predetermined secondary transferring timing. In the secondary transferring unit 13, the color toner image on the intermediate transfer belt 10 is secondarily transferred on the sheet. The sheet secondary transferred the color toner image is conveyed to a downstream side on the conveying path 15, and is ejected from the sheet ejecting port to the sheet ejecting tray after the color toner image is fixed to the sheet by the fixing device.

Figure 2:
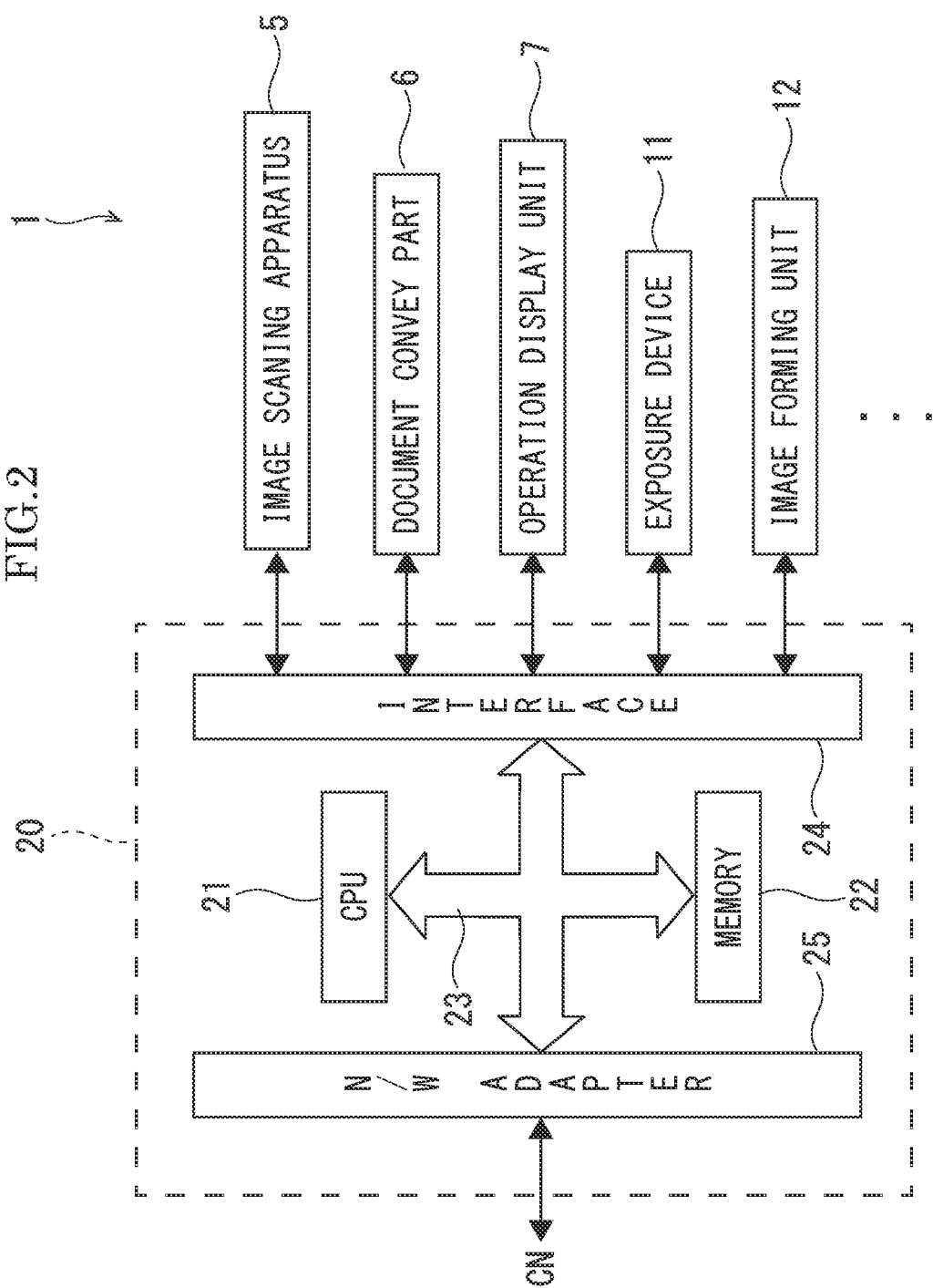
FIG. 2 is a block diagram showing an electrical structure related to a control device of the multifunction peripheral according to the embodiment of the present disclosure.

With reference to FIG. 2, the control device 20 is included in the multifunction peripheral 1 will be described. FIG. 2 is a block diagram showing an electrical structure of the control device 20 and its related components. Roughly describing, the control device 20 connects to each part of the multifunction peripheral 1 and electrically controls functions of the multifunction peripheral 1.

As shown in FIG. 2, the control device 20 includes a CPU (Central Processing Unit) 21, a ROM (Read Only Memory), a RAM (Random Access Memory), a memory 22 configured by a storage device such as a flash memory or the like, a bus 23 used for signal transfer between components, an interface 24 to be a contact between the multifunction peripheral 1 and each part, and a network (N/W) adapter 25 to be a contact with a communication network CN.

The CPU 21 is a computer of the multifunction peripheral 1, and performs arithmetic processing based on a control program and control data stored in the memory 22. The memory 22 stores the control program, the control data and others which are used for the arithmetic processing by the CPU 21, and stores arithmetic result and others of the CPU 21 temporarily. In other words, the memory 22 is a non-transitory computer readable medium which stores the control program.

The bus 32 connects with the CPU 21, the memory 22, the interface 24, and the N/W adapter 25 each other. The interface 24 is electrically connected to each part (for example, the image scanning apparatus 5, the document convey part 6, the operation display unit 7, the exposure device 11, the image forming unit 12 and others) of the multifunction peripheral 1. The N/W adapter 25 is connected to the communication network CN. A network configuration according to the present embodiment will be described later.

Figure 3:
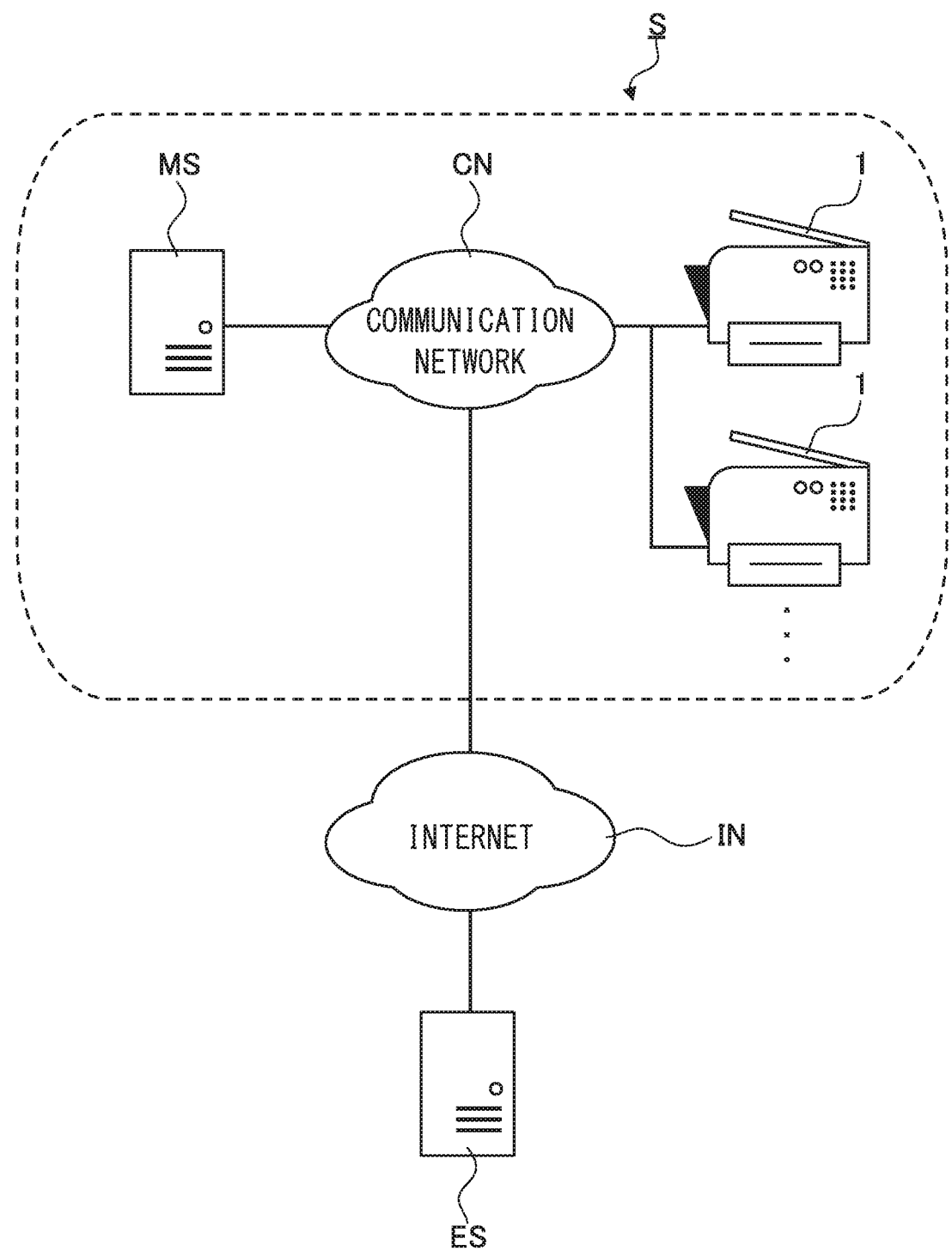
FIG. 3 is a structural diagram of a network including the multifunction peripheral according to the embodiment of the present disclosure.

With reference to FIG. 3, the network configuration according to the present embodiment will be described. An image forming system S of the present embodiment includes the plurality of multifunction peripherals 1 and a management server MS which are connected to the communication network CN respectively. The multifunction peripheral 1 is, for example, installed in a floor of an office. The management server MS is a server apparatus which manages the multifunction peripheral 1. The communication network CN is a closed network (in-enterprise network) covered the office, and is constructed by, for example, LAN (Local Area Network).

The communication network CN is connected to an internet IN via a gateway server not shown in the figure, and an external server ES which distributes application programs AP (makes terminals download application programs AP) is connected to the internet IN. However, hereinafter, "application program" may be abbreviated as "application" and "download" may be abbreviated as "DL".

The above communication network CN and the above internet IN conform to a predetermined communication protocol such as the TCP/IP protocol suite, each node (the multifunction peripheral 1, the management server MS, the external server ES and others) is assigned an identifier such as an IP address. The multifunction peripheral 1 is connectable to other multifunction peripheral 1 and the management server MS via the communication network CN, and is connectable to the internet IN.

Figure 4:
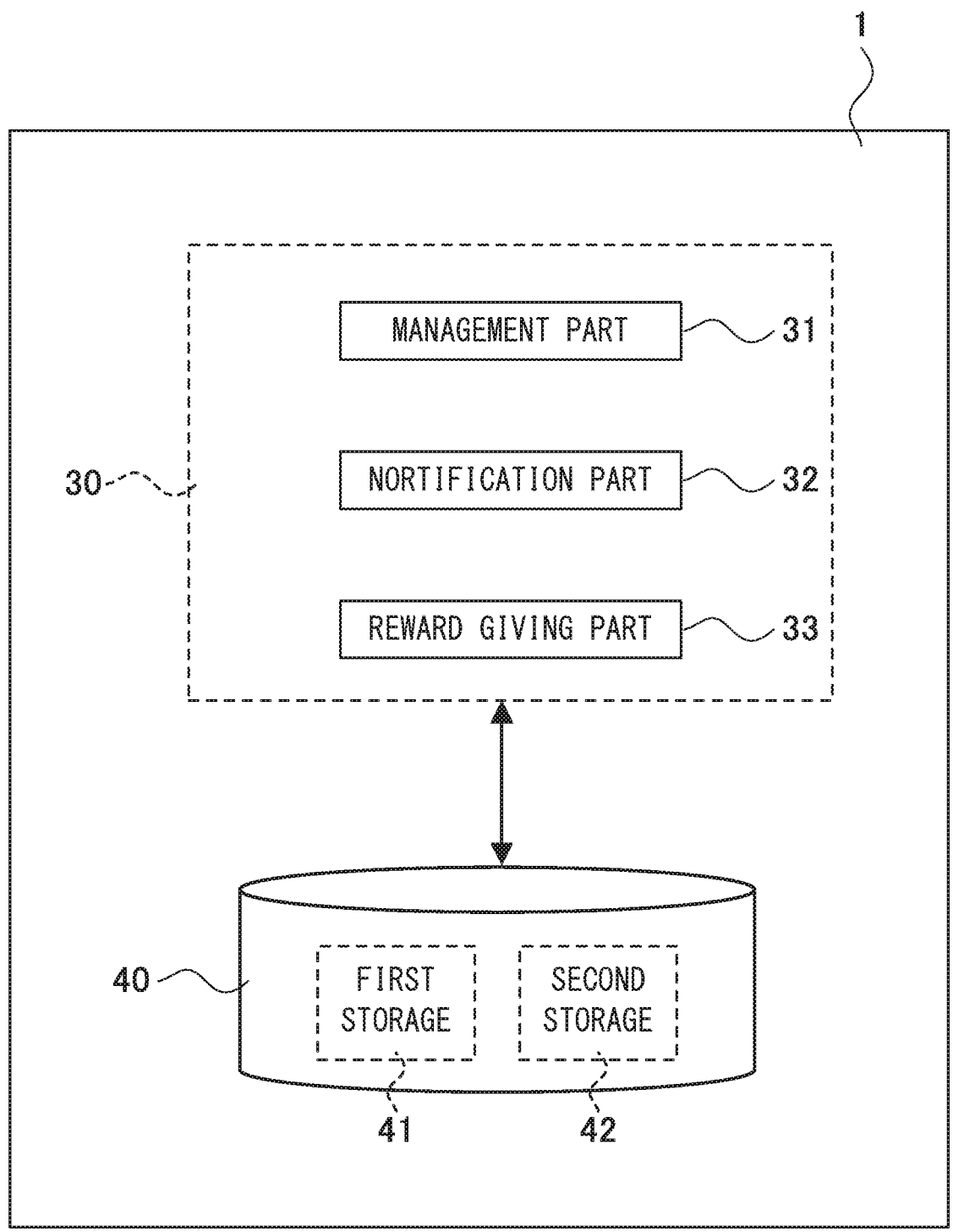
FIG. 4 is an explanatory drawing showing a logic structure of the multifunction peripheral according to the embodiment of the present disclosure.

With reference to FIG. 4, a logic structure realized by the multifunction peripheral 1 (especially the control device 20) will be described. The multifunction peripheral 1 includes a controller 30 which is a function block configured in a software manner by operation of the control device 20, and a storage 40 logically configured by the memory 22. The controller 30 includes, as the function block, a management part 31, a notification part 32, and a reward giving part 33.

The management part 31 manages installation and execution of the plurality of application programs AP. The notification part 32 notifies, according to a characteristic information CI of a user, a recommendation information RI related to the application program AP for a plurality of users. The reward giving part 33 gives the user a reward RW in response to the installation and the execution of the application program AP according to the recommendation information RI. The above function blocks are realized by the CPU 21 executing the control program stored in the memory 22. In other words, the control program makes the CPU 21 function as the management part 31, the notification part 32, and the reward giving part 33.

The storage 40 includes a first storage 41 and a second storage 42 which are areas logically reserved. The first storage 41 stores the characteristic information CI indicates characteristics of a plurality of users. The second storage 42 is capable of storing a plurality of application programs AP used by a plurality of users.

FIG. 5 shows an example of the characteristic information CI storing in the first storage 41. The characteristic information CI has a data structure which includes a plurality of entries uniquely specified by using a user ID as a key. Each of the entries corresponds to one user. Each of the entries of the characteristic information CI indicates a belonging information (for example, "DEPARTMENT" column, "POSITION" column, and "NUMBER OF MEETINGS" column in FIG. 5) related to an organization to which a user belongs, and a usage count of a user (for example, "SCANNER USAGE COUNT" column, and "COPY USAGE COUNT" column in FIG. 5) corresponding to each function that can be used in the multifunction peripheral 1. In addition, it may be possible to adopted a structure in which each of the entries indicates either one of the above belonging information or the usage count.

The belonging information may be input to the first storage 41 when a user operates the operation display unit 7, and the belonging information stored in the management server MS may be provided for the first storage 41 via the communication network CN. The controller 30 preferably counts the number of times of each process (for example, a scanner usage, a copy usage or the like) executed in the multifunction peripheral 1 by each of users and stores the number as the usage count in the first storage 41. In addition, the controller 30 may estimate the number of meetings based on a calendar of each of users registered in the management server MS.

Next, the recommendation processing in which the multifunction peripheral 1 recommends the application program to a user in the present embodiment will be described. Roughly describing, the controller 30 of the multifunction peripheral 1 notifies the recommendation information RI related to download and execution of the application program AP according to the characteristic information CI of a user with the user. It will be more concretely described as below.

Figure 6:
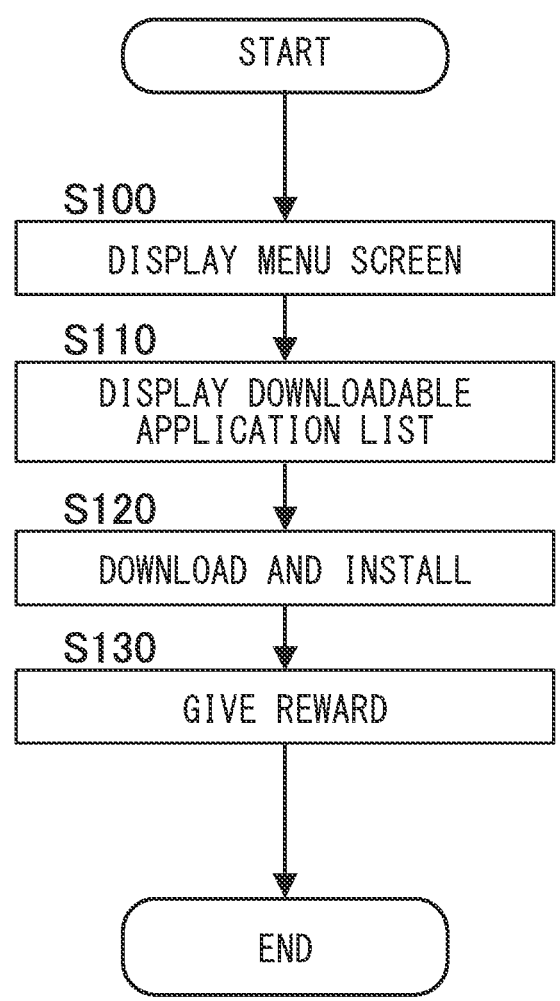
FIG. 6 is a flow chart of a download recommendation processing according to the embodiment of the present disclosure.

The above recommendation processing includes a download recommendation processing. FIG. 6 is a flowchart of the download recommendation processing in the present embodiment. When a user touches the operation display unit 7 of the multifunction peripheral 1, the notification part 32 controls the operation display unit 7 (display part) so as that a menu screen is displayed (step S100). The displayed menu screen includes a plurality of select item buttons including "downloadable application list display" button and "usable application list display" button.

When a user selects the "downloadable application list display" button, the management part 31 accesses to the external server ES to get a list of the application programs AP which can be download. Then, the notification part 32 displays application programs AP which the multifunction peripheral 1 can download (that is, which is not yet downloaded in the multifunction peripheral 1) to the operation display unit 7 (step S110).

Figure 7:
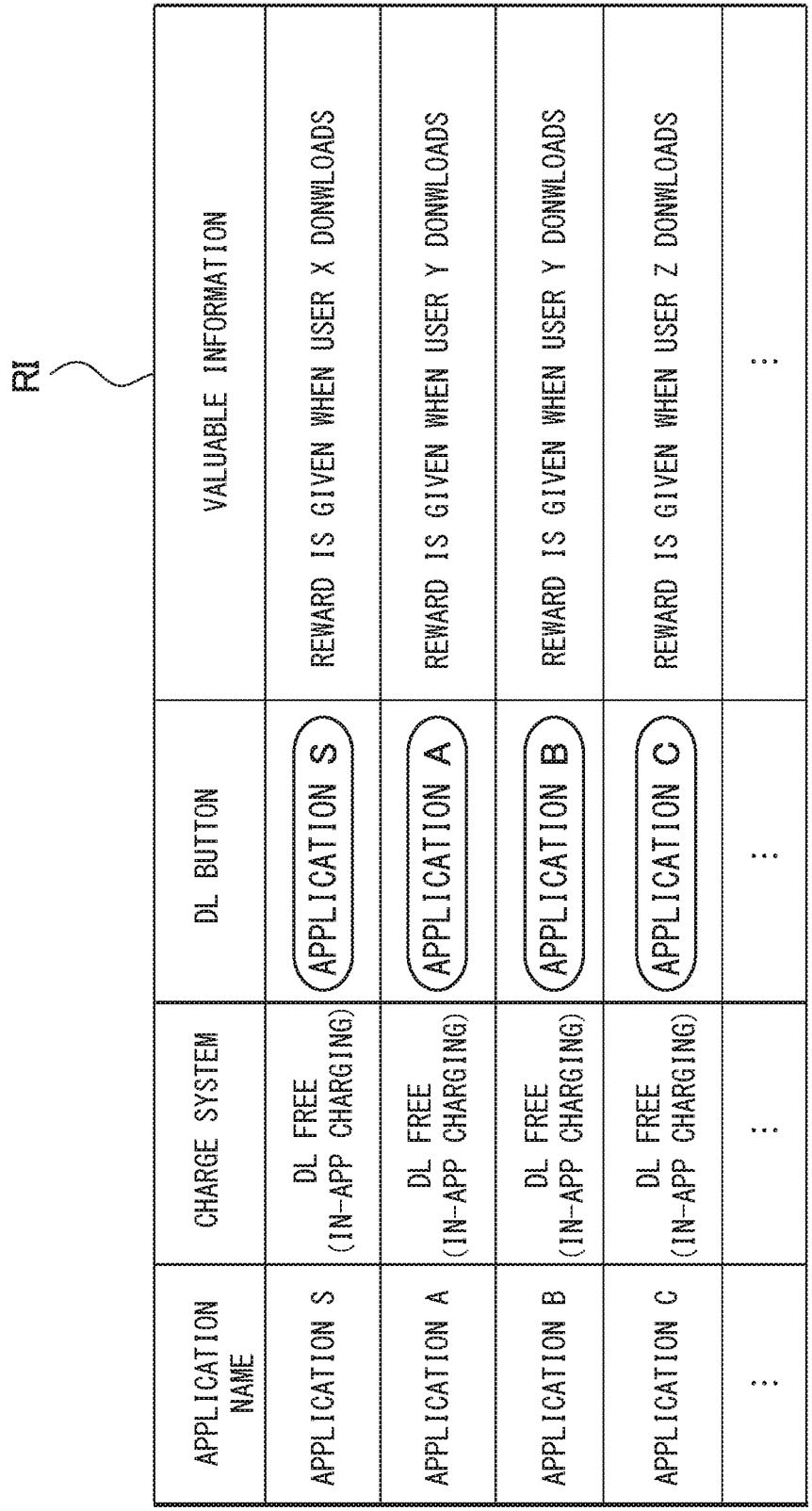
FIG. 7 is a diagram showing an example of a downloadable application list screen according to the embodiment of the present disclosure.

FIG. 7 shows an example of a downloadable application list screen. A name ("APPLICATION NAME" column), a charge system, a download button ("DL BUTTON" column), and the recommendation information RI ("VALU- ABLE INFORMATION" column) are displayed to the downloadable application list screen for every application program AP. The charge system is an information which indicates whether download of the application program AP involves costs and whether using the application program AP involves costs (whether charging is generated). Incidentally, "IN-APP CHARGING" in FIG. 7 indicates charging is generated when using the application program AP. When the download button is pushed by operating the operation display unit 7, the corresponding application program AP is downloaded and installed on the multifunction peripheral 1. The recommendation information RI is an information which indicates that the reward RW is given by the reward giving part 33 when the corresponding application program AP is downloaded.

In step S110 of the download recommendation processing, the notification part 32 displays, to the operation display unit 7, the recommendation information RI which indicates that the reward RW is given when the application program AP which is not yet installed on the multifunction peripheral 1 is downloaded. In addition, as is apparent from FIG. 7, the notification part 32 displays, to the operation display unit 7, the recommendation information RI related to not only a user operating the multifunction peripheral 1 but a plurality of users registered in the multifunction peripheral 1.

When a user pushes the download button, the management part 31 downloads the application program AP corresponding to the pushed download button from the external server ES and installs the application program AP in the storage 40 (step S120).

When the download and installation in step S120 are finished, the reward giving part 33 gives the reward RW to the user who instructed to execute the download (step S130). The given reward RW is, for example, a virtual point which a user can be used. The virtual point can be used for downloading of the application program AP, for executing the application program AP at a metered rate (that is, for charging), and for obtaining consumable articles (for example, a toner cartridge) used in the multifunction peripheral 1. When step S130 is finished, the process of the flowchart in FIG. 6 is completed.

The application program AP showed in FIG. 7 will be explained with a concrete example. An application S is an OCR application which recognizes character parts included in a scanned image data and translates the character parts to text data. Although an installation itself of the application S is free, charging is generated according to a quantity of recognized characters. User X recommended to download the application S is a user whose scanner usage count is relatively large. That is, the notification part 32 can select, according to a usage count of a function, a user to be notified.

An application A is a business card registration application which scans a business card and registers a information described on the business card. Although an installation itself of the application A is free, charging is generated according to the number of registered business cards. User Y recommended to download the application A is a user whose number of meetings is relatively large.

An application B is a translation application which translates input text into other language. Although an installation itself of the application B is free, charging is generated according to the number of translated words. User Y recommended to download the application B is a user who is a responsible person of a global department. In addition, a user who actually performed translating in the past may be recommended. That is, the notification part 32 may select, according to the belonging information, a user to be notified.

An application C is a test marking application which performing a test marking with a scanned image data. Although an installation itself of the application C is free, charging is generated according to an amount of marking. User Z recommended to download the application C is a user who is a responsible person of a training department.

In addition, in step S120, the reward giving part 33 may make the reward RW different for every user according to the application program AP and the characteristic information CI. For example, as described above, when a user himself or herself who is recommended to download the application program AP downloads the application program AP, the user may be obtained the higher reward RW than when other users download the application program AP.

Figure 8:
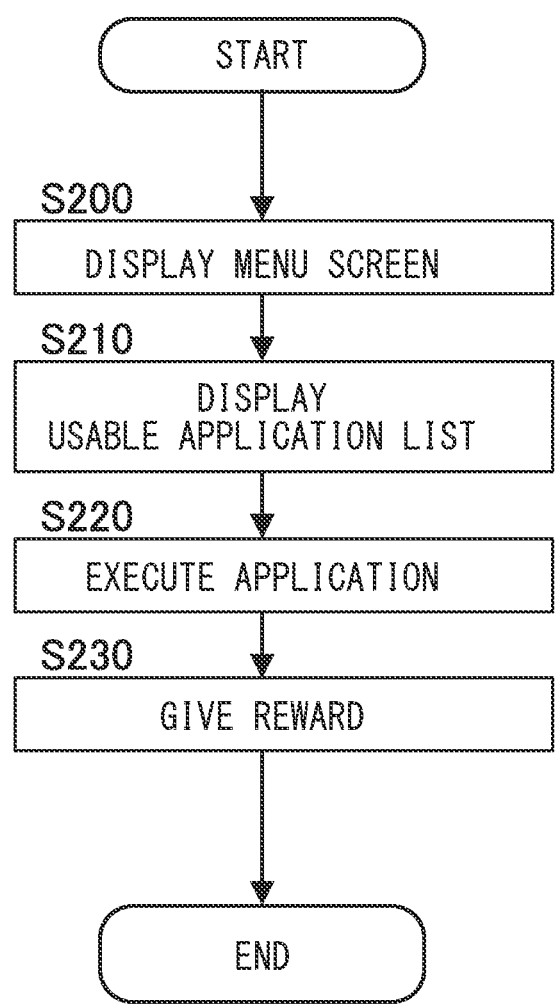
FIG. 8 is a flow chart of an execution recommendation processing according to the embodiment of the present disclosure.

Moreover, the above recommendation processing includes execution recommendation processing. FIG. 8 is a flow chart of the execution recommendation processing in the present embodiment. Since step S200 is similar to step S100 in FIG. 6 in which the menu screen is displayed, its explanation is omitted.

When the "usable application list display" button of the menu screen is selected by a user, the management part 31 obtains a list of the application programs AP which are already installed on the multifunction peripheral 1. Then, the notification part 32 displays the installed application programs AP to the operation display unit 7 (step S210).

Although a usable application list screen is roughly similar to the downloadable application list screen in FIG. 7, "DL BUTTON" column is replaced with "EXECUTION BUTTON" column in which execution buttons of each application are displayed. Moreover, when the application program AP which is already installed on the multifunction peripheral 1 is executed, text which indicates that the reward RW is given is displayed in the recommendation information RI ("VALUABLE INFORMATION" column). For example, with respect to the application S, "REWARD IS GIVEN WHEN USER X EXECUTES" is displayed.

Incidentally, the notification part 32 may display the recommendation information RI with respect to not all of the application programs AP which are already installed but only the application programs AP which are already installed but are not yet executed.

When a user pushes the execute button, the management part 31 executes the application program AP corresponding to the execution button (step S220). When the application program AP is executed in step S220, the reward giving part 33 gives the reward RW to the user who instructed the execution (step S230). When step S230 is finished, the process of the flow chart in FIG. 8 is completed. The reward giving part 33 may give points to the user according to an amount of charging based on the application program AP.

Next, technical effects of the present embodiment will be described. As described above, the multifunction peripheral 1 (image forming apparatus) is an apparatus used by a plurality of users who have mutually different characteristics, and includes the first storage 41 which stores the characteristic information CI indicating characteristics of the plurality of users, the second storage 42 which is capable of storing the plurality of application programs AP used by the plurality of users, the management part 31 which manages installation and execution of the plurality of application programs AP, and the notification part 32 which notifies, according to the characteristic information CI, the recommendation information RI related to the application program AP for the plurality of users.

In accordance with the above configuration, it is possible that the appropriate application program AP according to a characteristic of a user is recommended to a plurality of users. Since the recommendation information RI related to the plurality of users is presented to one user who uses the multifunction peripheral 1, the user presented with the recommendation information RI can know the recommendation information RI related to other users. The user communicates contents of the recommendation information RI to other users, as a result, it is possible to communicate an existence of the appropriate application program AP to the plurality of users broadly.

Moreover, In accordance with the configuration in which the reward giving part 33 gives the reward RW to the users in response to the installation and the execution of the application program AP according to the recommendation information RI, it is possible that motivation of the user to install or the execute the application program AP is improved more.

Moreover, in accordance with the configuration in which the notification part 32 displays, to the operation display unit 7, the recommendation information RI which indicates that the reward RW is given when the application program AP which is not yet installed on the multifunction peripheral 1 is downloaded, it is possible to urge the user to download the application program AP.

Moreover, in accordance with the configuration in which the notification part 32 displays, to the operation display unit 7, the recommendation information RI which indicates that the reward RW is given when the application program AP which is already installed on the multifunction peripheral 1 is executed, it is possible to urge the user to execute the application program AP.

Moreover, in accordance with the configuration in which the application program AP which the recommendation information RI is displayed is the application program AP which is already installed but is not yet executed, it is possible to further urge to execute the application program AP which is not yet used.

Moreover, in accordance with the configuration in which the reward RW is made different for every user according to the application program AP and the characteristic information CI, since the reward RW suitable for each of users is set, it is possible to further urge to download and install the application program AP.

Moreover, in accordance with the configuration in which the characteristic information CI of the user indicates at least one of the usage count of the user of each function that can be used in the multifunction peripheral 1 and the belonging information related to an organization to which the user belongs, a characteristic of the user is presented appropriately.

Moreover, in accordance with the configuration in which the reward RW given by the reward giving part 33 is the virtual point which a user can be used for at least one of a purpose of downloading of the application program AP, a purpose of executing the application program AP at a metered rate, and a purpose of obtaining consumable articles used in the multifunction peripheral 1, it is possible to further urge to download and install the application program AP by motivation to desire to save points.

The control program of the present embodiment is a computer program which is executed by the CPU 21 as a computer in an image forming apparatus such as the multifunction peripheral 1 or the like. The control program is stored in the memory 22 as a non-transitory computer readable medium. It is possible to added the above functions to the multifunction peripheral 1 which does not initially have these functions, by providing the above functions such as the management part 31, the notification part 32, the reward giving part 33 and others as the control program.

The embodiment described above can be variously modified. Modified embodiments will be described below. Two or more aspects arbitrarily selected from the embodiment and the modified embodiments can be merged as long as they do not contradict each other.

In the embodiment as described above, the reward giving part 33 gives a user who downloads or executes the application program AP the reward RW. However, in a case of the application program AP installed by one user is executed by another user, the reward giving part 33 may give the reward RW to the one user (who installed the application program AP). In accordance with the above configuration, it is possible that motivation to install the suitable application program AP on the multifunction peripheral 1 is improved more.

Since the image forming system S includes the plurality of multifunction peripherals 1, the reward giving parts 33 of the plurality of multifunction peripherals 1 may, in cooperation with each other, set the reward RW which gives a user to become higher, as a frequency of use the multifunction peripheral 1 becomes lower. In accordance with the above configuration, motivation to use the multifunction peripheral 1 of which frequency of use is low can be improved more, therefore, it is possible to level the frequency of use of the plurality of multifunction peripherals 1.

In the embodiment described above, the case where the configuration of the present disclosure is applied to the multifunction peripheral 1 that is an example of the image forming apparatus or to the image forming system S including the multifunction peripheral 1 is described. However, in other different embodiment, the configuration of the present disclosure may be applied to other image processing apparatus such as a printer, a scanner, a facsimile or the like and to other image forming systems including such other image processing apparatus.

Since the description of the embodiment described as above describes a preferred embodiment of the multifunction peripheral 1 according to the present disclosure, there may be various technically preferable limitations. However, the scope of the present disclosure is not limited to these aspects unless specifically described to limit the present disclosure. Furthermore, the constituent elements in the embodiments of the present disclosure described above can be appropriately replaced with existing constituent elements and others, and various variations including combinations with other existing constituent elements can be applied. Moreover, the description of the embodiment of the present disclosure does not limit the content of the disclosure described in the claims.

The invention claimed is:

1. An image forming apparatus used by a plurality of users who have mutually different characteristics, the image forming apparatus comprising:
   a first storage storing a characteristic information indicating characteristics of the plurality of users;
   a second storage being capable of storing a plurality of application programs used by the plurality of users;
   a management part managing installation and execution of the plurality of application programs;
   a notification part notifying, according to the characteristic information, a recommendation information related to the application program for the plurality of users; and a reward giving part giving reward to the users in response to the installation or the execution of the application program according to the recommendation information.

2. The image forming apparatus according to claim 1, wherein
the notification part displays, to a display part, the recommendation information which indicates that the reward is given when the application program which is not yet installed on the image forming apparatus is downloaded.

3. An image forming system comprising the image forming apparatus according to claim 2, wherein
the reward giving parts of the plurality of image forming apparatus, in cooperation with each other, set the reward which gives the user to become higher, as a frequency of use the image forming apparatus in which the installation or the execution of the application program is performed becomes lower.

4. The image forming apparatus according to claim 1, wherein
the notification part displays, to a display part, the recommendation information which indicates that the reward is given when the application program which is already installed on the image forming apparatus is executed.

5. The image forming apparatus according to claim 4, wherein
the application program which the recommendation information is displayed is the application program which is already installed on the image forming apparatus but is not yet executed.

6. An image forming system comprising the image forming apparatus according to claim 5, wherein
the reward giving parts of the plurality of image forming apparatus, in cooperation with each other, set the reward which gives the user to become higher, as a frequency of use the image forming apparatus in which the installation or the execution of the application program is performed becomes lower.

7. An image forming system comprising the image forming apparatus according to claim 4, wherein
the reward giving parts of the plurality of image forming apparatus, in cooperation with each other, set the reward which gives the user to become higher, as a frequency of use the image forming apparatus in which the installation or the execution of the application program is performed becomes lower.

8. The image forming apparatus according to claim 1, wherein
the reward giving part makes the reward different for every user according to the application program and the characteristic information.

9. An image forming system comprising the image forming apparatus according to claim 8, wherein
the reward giving parts of the plurality of image forming apparatus, in cooperation with each other, set the reward which gives the user to become higher, as a frequency of use the image forming apparatus in which the installation or the execution of the application program is performed becomes lower.

10. The image forming apparatus according to claim 1, wherein
the characteristic information of the user indicates at least one of a usage count of the user of each function that can be used in the image forming apparatus and a belonging information related to an organization to which the user belongs.

11. The image forming apparatus according to claim 1, wherein
the reward given by the reward giving part is a virtual point which a user can be used for at least one of a purpose of downloading of the application program, a purpose of executing the application program at a metered rate, and a purpose of obtaining consumable articles used in the image forming apparatus.

12. An image forming system comprising the image forming apparatus according to claim 11, wherein
the reward giving parts of the plurality of image forming apparatus, in cooperation with each other, set the reward which gives the user to become higher, as a frequency of use the image forming apparatus in which the installation or the execution of the application program is performed becomes lower.

13. An image forming system comprising the image forming apparatus according to claim 1, wherein
the reward giving parts of the plurality of image forming apparatus, in cooperation with each other, set the reward which gives the user to become higher, as a frequency of use the image forming apparatus in which the installation or the execution of the application program is performed becomes lower.

14. A non-transitory computer readable medium storing a control program which is executed in an image forming apparatus comprising a first storage storing a characteristic information indicating characteristics of a plurality of users and a second storage being capable of storing a plurality of application programs used by the plurality of users, wherein
the control program makes a computer of the image forming apparatus function as:
a management part managing installation and execution of the plurality of application programs;
a notification part notifying, according to the characteristic information, a recommendation information related to the application program for the plurality of users; and
a reward giving part giving reward to the users in response to the installation or the execution of the application program according to the recommendation information.

* * * * *